Figure 1:
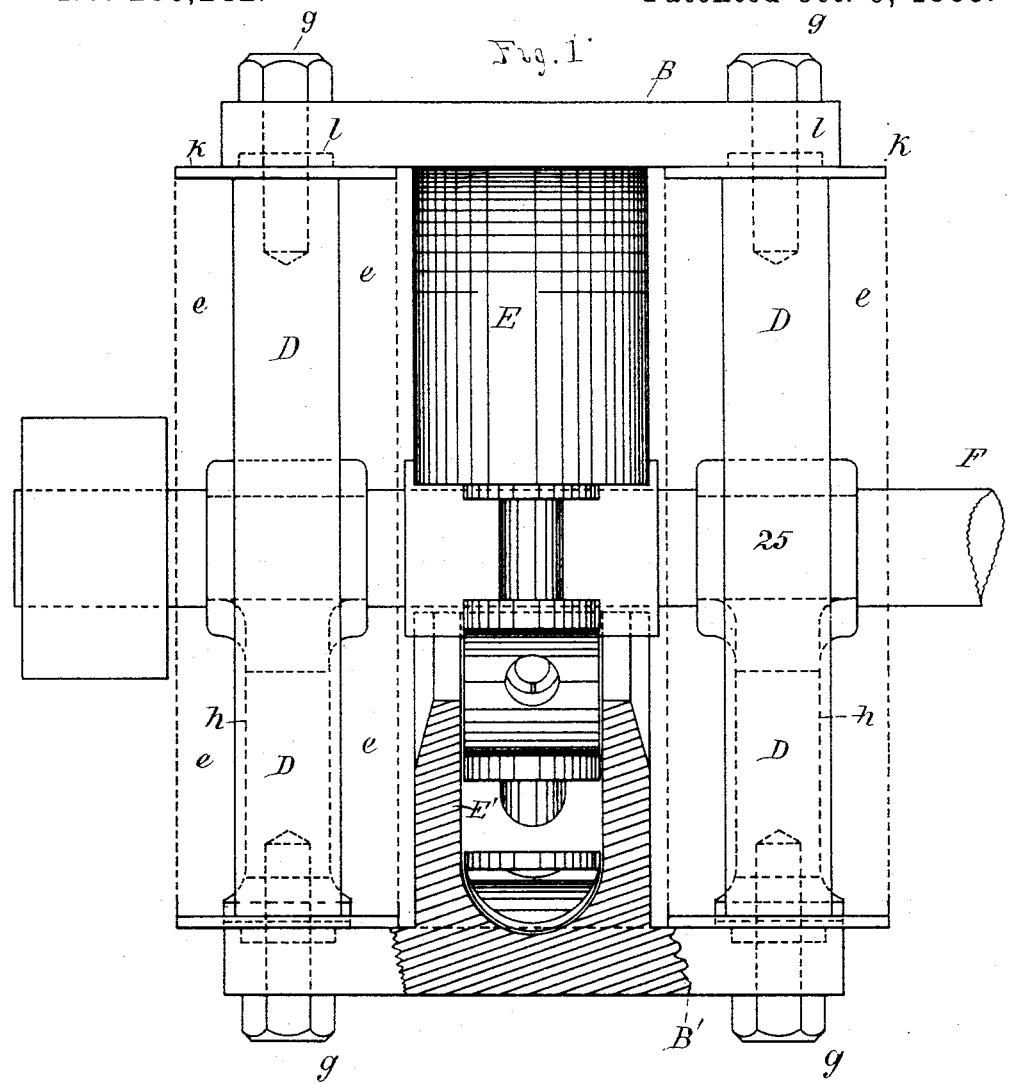

(No Model.) 8 Sheets—Sheet 1.

S. F. VAN CHOATE.
DYNAMO ELECTRIC MACHINE.

No. 286,242. Patented Oct. 9, 1883.

Witnesses
Wm. B. Brown
Hu. P. Richards

Inventor
S. F. Van Choate (No Model.)  8 Sheets—Sheet 2.
S. F. VAN CHOATE.
DYNAMO ELECTRIC MACHINE.
No. 286,242.  Patented Oct. 9, 1883.
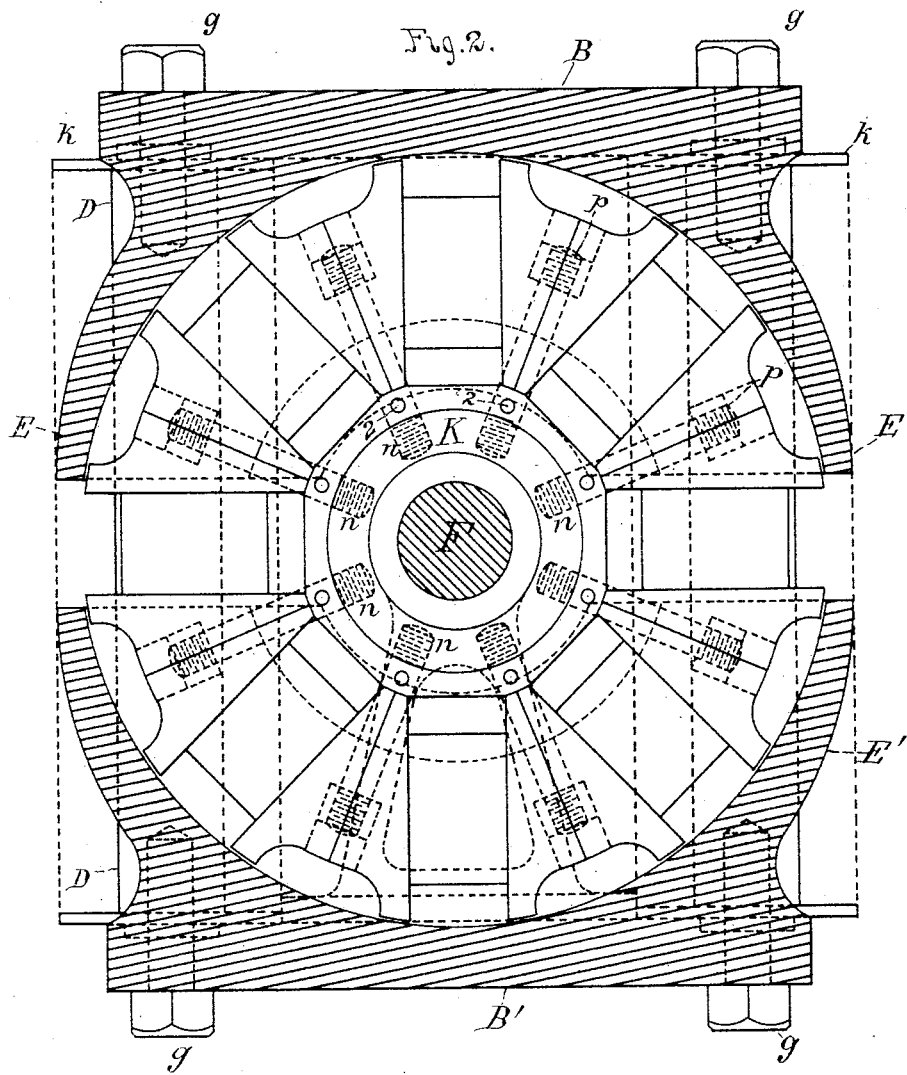
Witnesses
Wm. S. Brown
Wm. P. Richards
Inventor
S. F. Van Choate (No Model.) 8 Sheets—Sheet 3.
S. F. VAN CHOATE.
DYNAMO ELECTRIC MACHINE.
No. 286,242. Patented Oct. 9, 1883.
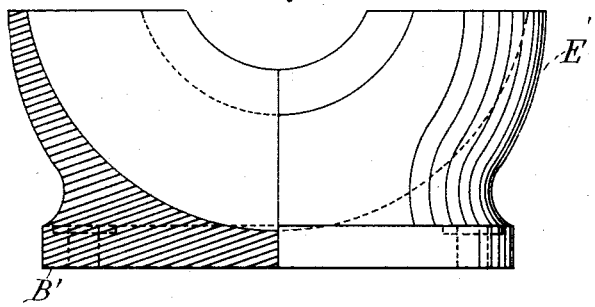
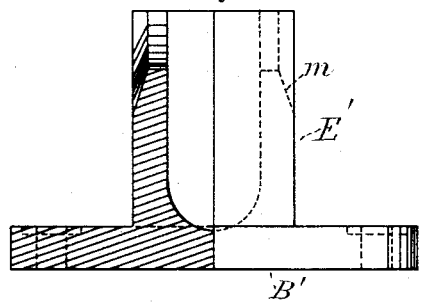
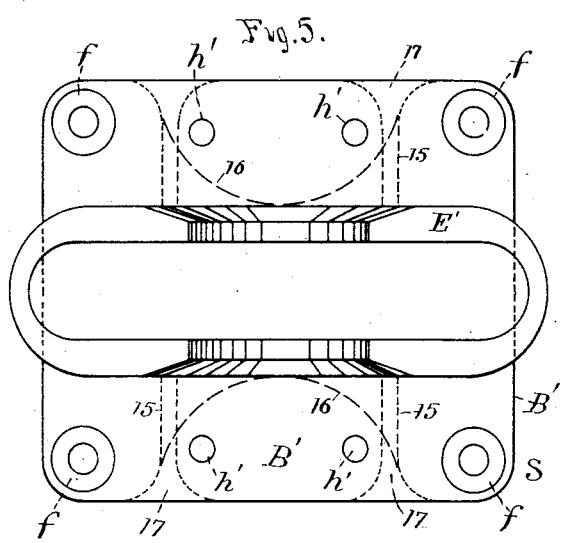
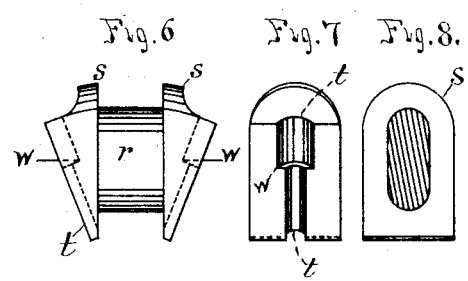
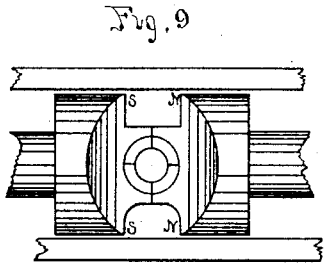
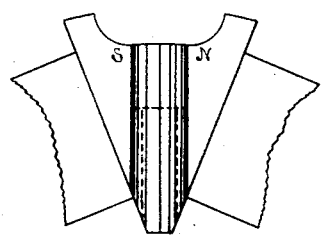
Witnesses
Wm. D. Brown
Wm. P. Richards.
Inventor
S. F. Van Choate (No Model.)

8 Sheets—Sheet 4.

S. F. VAN CHOATE.
DYNAMO ELECTRIC MACHINE.

No. 286,242. Patented Oct. 9, 1883.

(No Model.)
8 Sheets—Sheet 5.
S. F. VAN CHOATE.
DYNAMO ELECTRIC MACHINE.
No. 286,242.
Patented Oct. 9, 1883.
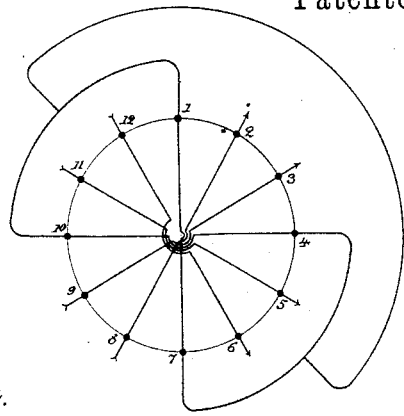
Fig. 13.
Fig. 14.
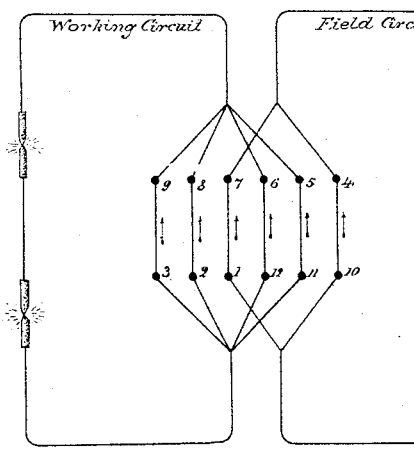
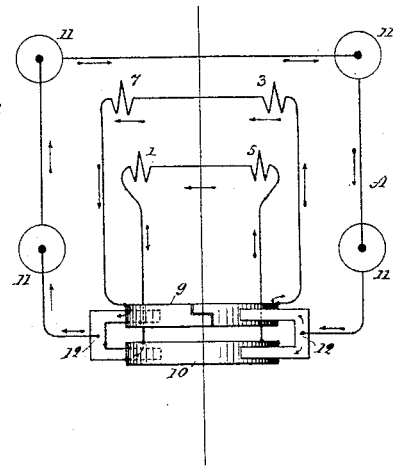
Fig. 15.
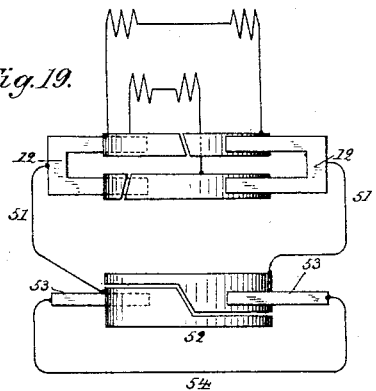
Fig. 19.
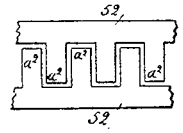
Fig. 24.
Witnesses:
Ernest Abshagen
Thos. Toomey
Inventor:
S. F. Van Choate,
By his Attorney: H. C. Townsend (No Model.)   8 Sheets—Sheet 6.

S. F. VAN CHOATE.
DYNAMO ELECTRIC MACHINE.

No. 286,242.  Patented Oct. 9, 1883.

Witnesses:
Ernest Abshagen
Thos. Toomey

Inventor:
S. F. Van Choate,
By his Attorney: R. C. Townsend (No Model.)  S. F. VAN CHOATE.  8 Sheets—Sheet 7.
DYNAMO ELECTRIC MACHINE.
No. 286,242.  Patented Oct. 9, 1883.
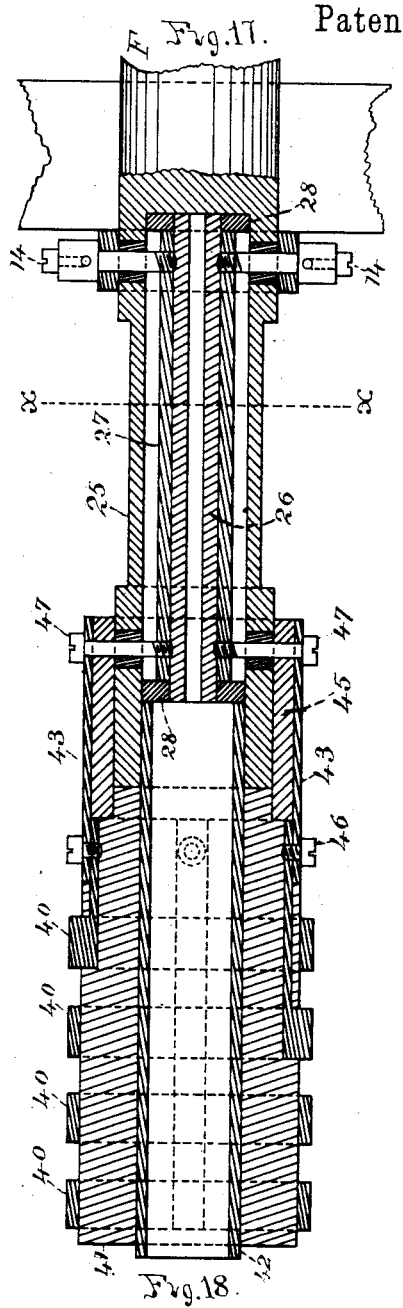
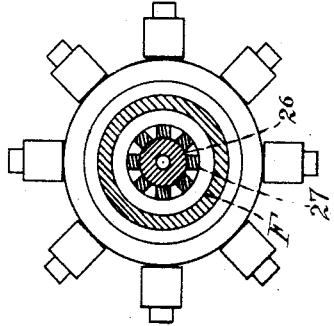
Witnesses
Wm. B. Brown
Hu. P. Richards
Inventor
S. F. Van Choate (No Model.) 8 Sheets—Sheet 8.

S. F. VAN CHOATE.
DYNAMO ELECTRIC MACHINE.

No. 286,242. Patented Oct. 9, 1883.

ATTEST:
J. A. Hurdle,
Thos. Tormey.

INVENTOR:
S. F. Van Choate
by H. C. Townsend
Atty.

N. PETERS, Photo-Lithographer, Washington, D. C.

UNITED STATES PATENT OFFICE.

SILVANUS F. VAN CHOATE, OF NEW YORK, N. Y.

DYNAMO-ELECTRIC MACHINE.

SPECIFICATION forming part of Letters Patent No. 286,242, dated October 9, 1883.

Application filed June 12, 1882. (No model.)

*To all whom it may concern:*

Be it known that I, SILVANUS F. VAN CHOATE, a citizen of the United States, and a resident of New York, in the county of New York and State of New York, have invented certain new and useful Improvements in Dynamo-Electric Machines, of which the following is a specification.

The objects of my invention are to produce a more simple, compact, economical, efficient, and durable dynamo-electric machine than other machines of like nature. I accomplish these objects by introducing several novel features, among which may be mentioned the following: first, a radical and peculiar construction and combination of the so-called "field-magnets," as well as the armature and armature-magnets; second, the peculiar arrangement of the connections of the magnets and the commutator, by means of which the field-magnets and the magnetic field of force in which the armature and armature-magnets move are maintained at a steady and uniform maximum efficiency, not being changed or disturbed in any way by any change in the so-called "external" circuit or line, or in the electric currents existing or acting therein; third, the peculiar manner of construction, arrangement, and combination of the double compound U-magnets encompassing the armature and armature-coils with peculiar polarities; fourth, the peculiar construction and division of the commutator, by which the field-of-force magnets may be fed or maintained charged with unipolar currents—that is, currents passing in one continuous direction—while the currents taken off and passed through the exterior field or line may be bipolar or alternating currents, and vice versa, all the currents employed, both those for energizing the field-magnets and those for supplying the external circuit, being supplied from the same armature; fifth, the arrangement by which all the armature magnets or coils are kept perpetually in circuit; sixth, the peculiar and novel arrangement of the so-called "neutral" line or points of the double compound U-magnets, and the line of change of polarity of the armature; seventh, the manner of constructing the armature in a series of segmental U-magnets, and so that its coils can be wound in a lathe, and also the manner of securing them to the shaft.

Figure 11:
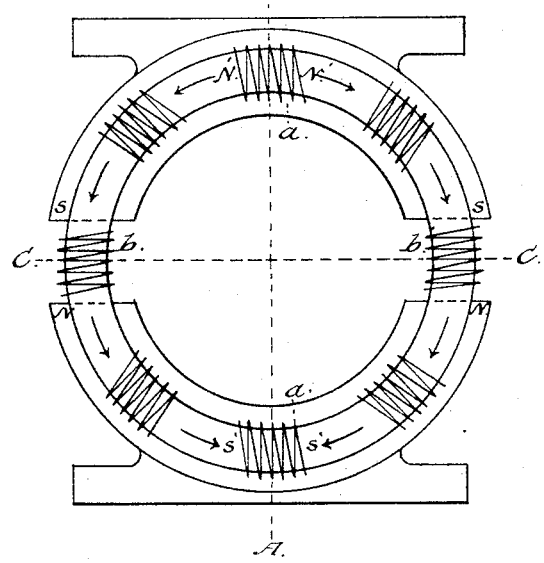
Figure 12:
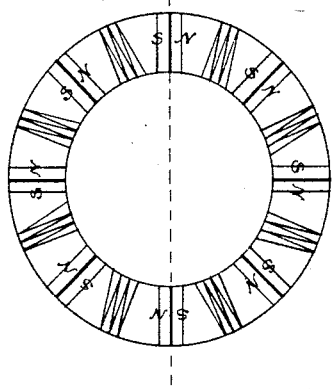
Figure 22:
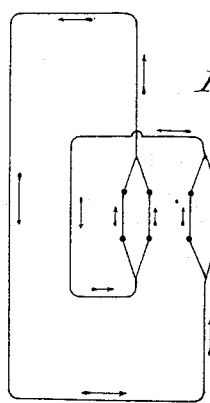
Figure 23:
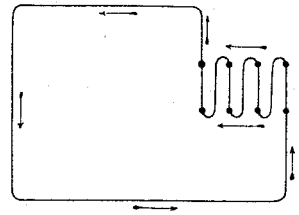
Figure 21:
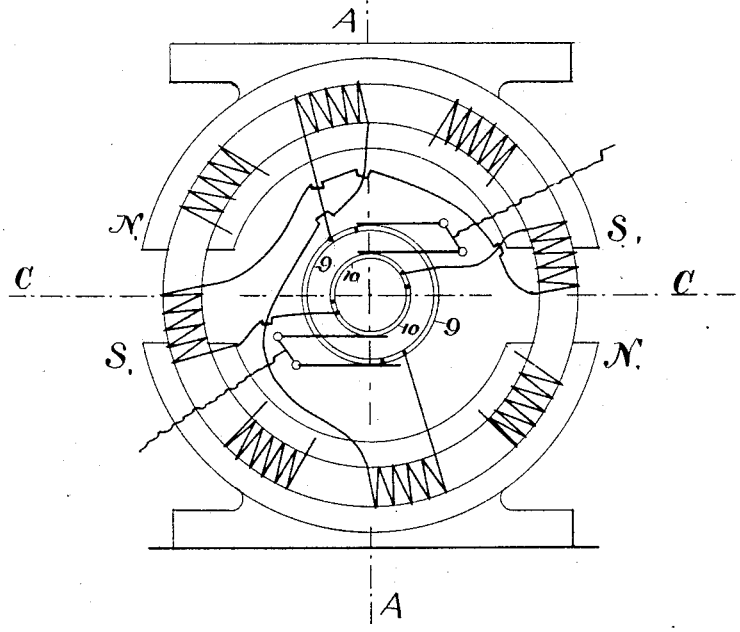
Figure 20:
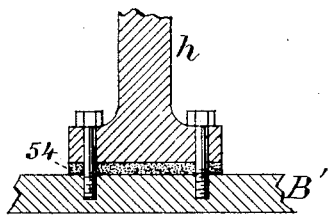

In the accompanying drawings, Figure 1 is an end view of the machine in partial section, showing the field-magnet coils in dotted outline. Fig. 2 is a vertical section of the double compound U-magnet constituting the field-magnet of the machine, taken on a line at right angles to the shaft, the armature and details of construction of the same being shown in side view. Fig. 3 is a side view, half in section, of my peculiar field-magnet pole-piece and the end or bed plate of which it forms a part. Fig. 4 is an end view, half in section and half in elevation, taken at right angles from Fig. 3. Fig. 5 is a plan view, looking down upon the bed-plate from which the U-magnet pole-piece projects. Figs. 6, 7, 8, 9, 10 are detail views, showing the manner of constructing my segmental armature. Figs. 11 and 12 are diagrammatic views illustrative of the magnetic polarities of the armature, when combined with the field-magnets having the peculiar polarities and construction of my invention. Figs. 13, 14, 15, 16, and 19 are diagrams illustrating the connections and circuits of the machine. Figs. 17 and 18 show the construction of the commutator. Fig. 20 shows in detail the standard supporting the armature-shaft. Fig. 21 is a diagram of circuits. Figs. 22 and 23 are diagrams, and Fig. 24 shows a portion of a current-reverser.

Heretofore in dynamo-machines having cylindrical or ring armatures the so-called "neutral line" has been commonly located or made to produce its effects—that is, change the polarity in the armature on a line in the center of the open space and between the poles of the field-magnets, as indicated by the dotted line C C in Fig. 11—and the commutators have been constructed so as to successively cut out of circuit the helices or coils of the armature for a longer or a shorter interval as they pass through this open space. In my invention I have placed the neutral line on line at A A, which is at right angles to the line C C, and I keep all the coils of the armature perpetually in circuit as they pass the line C C. By this arrangement the polarity of the coils and the armature are changed on the line A A instead of on line C C, as in previous machines. Fig. 11 explains the principles and arrangement of the polarities and armatures of machines constructed in accordance with this form of my invention.

The positive poles of the double compound U-magnets of the field of force are indicated by the letters N N, and those of the negative poles by the letters S S. The annular armature is divided into two imaginary or bisegmental armatures or keepers, as indicated by the letters N' and S' on the left and S' and N' on the right-hand side of line A A, the former constituting a bridge or keeper across the two jaws of the double compound U-magnets on the left, and the latter forming a bridge or keeper across the jaws on the right-hand side. It will be observed that in this arrangement there are three coils fully in the immediate magnetic field on either side of the line A A, while the other two coils, $a\ a$, are just on the neutral line of my machine, and just about passing or changing from one polarity to the other, the central coils on either side being exactly in the open space between the jaws of the U-magnets. In other ring or cylinder machines, while passing this space the coils or helices are thrown out of circuit by the commutators; but in my invention they are kept in circuit, since in the construction of machine herein described I find that the helices, while passing through this space, receive more powerful inductive charges than they do at any other portion of the circle. The magnetism emanating or flowing from one pole to the other of the double compound U-magnets along the segmental armatures or keepers charges the coils inductively with electricity, which is taken off by the brushes and commutators and distributed as desired.

I will first describe the general construction of the machine and the peculiar field-of-force poles, and then will proceed by the aid of the drawings to point out the peculiarities in the magnetic polarities of the field-of-force poles, and the action of the field-of-force pole upon the armature.

Referring to Figs. 1 and 2, B represents the top plate, and B' the bed-plate, of the machine, of iron, which are directly secured together by four posts, D D D D, of iron, which are wound with coils of wire and form the field-of-force magnets, and from which plates project inwardly toward one another field-of-force pole-pieces E E', either formed in one piece with the bottom and top plates or suitably fastened thereto, said pole-pieces being grooved in the manner shown in Figs. 3 and 4, and curved to the circumference of the armature, so as to each embrace the armature for nearly half of its circumference and upon three of its sides. Said pole-pieces are beveled or cut away at their sides at $m$, as shown in Fig. 4, to lighten the piece and to remove material that would otherwise uselessly absorb magnetism.

The position of the posts D D, &c., is clearly indicated in Fig. 5, the countersunk holes in which said posts are fixed being indicated at $ff$, &c., at the four corners of the bed-plate. The coils of wire encircling said posts fill the spaces $e\ e$, Fig. 1, while the bolts which fasten the plates B B and the posts together are shown at $g\ g\ g\ g$. The posts D D, which form the cores for the field-of-force coils, are provided with heads or flanges $k\ k$, integral with them, and also have projections $l\ l$ at both ends, which project slightly beyond the flanges, and which enter into perforations in the top and bed plates, the heads or flanges at the same time resting flat against the plates, so as to give stability to the structure and to secure good magnetic contact.

It will be noticed that in my invention the field-magnets D D, &c., are arranged in pairs and parallel to each other, with their similar ends connected together by means of two solid iron plates, B B', and the extension or elongations E E' of the said ends, by means of said plates, turn back inwardly and approximately near and also parallel with the sides of said magnets. These inwardly-turned ends almost meet at a central point along the sides of said magnets. The central portion of the sides of the projecting pole-plates are cut out on a radius from the center of the shaft of the machine in a semicircular form, while the same projections in a longitudinal direction, which is at right angles to the said shaft, are hollowed out in such a manner as to form a deep U-shaped semicircular groove, as shown in Fig. 5, and in which groove the armature revolves in a direction parallel with said magnets. The convolutions of the wire upon the magnets, besides directly charging the cores, serve also to charge inductively the turned-back projecting ends or poles by reason of the proximity of said poles to said coils or convolutions, the terminal pole pieces, the magnets, and the armature all being arranged parallel to each other. Any desired number of magnets D may be employed at each end of the machine for polarizing the pole-pieces. I employ four magnets—two at each end—for the sake of simplicity and economy.

F represents the shaft of the machine, journaled in two upright posts, $h\ h$, of iron, which are seated on the bed-plate B', being secured thereto by bolts or screws passing through flanges in the bottom of the posts, and through perforations at $h'\ h'$, Fig. 5, in the bed-plate. Instead of allowing said posts to rest directly upon the iron base-plate, as is ordinarily done, I separate them from it by a plate of non-magnetic material, 54, Fig. 20, which prevents the dissipation of the magnetism in the plates into the posts and shaft of the machine, and also prevents any disturbance of the proper polarities of the field-of-force magnets. The bolts or screws which secure the posts to the bed-plate are also of some non-magnetic material—as, for instance, gun-metal. The above construction is cheap, and at the same time avoids the defects and disturbances referred to. It is to be observed, however, that the posts might be made entirely of non-magnetic material; but this would, ordinarily, be more expensive.

The segmental sectional armature is constructed in the following manner:

K, Fig. 2, represents a hub of some non-magnetic material suitably secured to the shaft, into which are screwed a number of spokes, $n\ n$, &c., which spokes are fixed in place and prevented from turning by dowel-pins, or by set-screws 2 2, &c., passing through the sides of the hub, and which spokes are screw-threaded at their outer ends for the reception of nuts $p\ p$, &c. Each segmental section of the armature is constructed, in the manner shown in Figs. 6, 7, 8, 9, and 10, with a middle portion, $r$, upon which an armature-coil is wound, and with two heads or flanges, $s\ s$, in the ends of which are formed countersunk grooves $t\ t$, the countersink in each end extending to a point, $w$, which is the geometrical center of the core $r$. The angles $w$ serve for the bearing-points upon which the section turns when it is mounted in a lathe for the purpose of winding a coil upon it. Fig. 7 shows an end view of one section, and Fig. 8 a transverse section through the portion $r$. The lower side of the flange $s$ is shown with a straight transverse edge which sets flat upon a flat bearing-surface extending straight across the hub. The bearing-face of the flange which rests upon the hub is slightly curved in the direction of the axis of the section to fit the curved circumference of the hub. The groove $t$ in the end of the section, in conjunction with the similar groove in the abutting end of the next section, forms a seat for a spoke $n$, as may be seen in Fig. 9, where two adjoining sections are shown as abutting against one another, the countersunk portion receiving the nut which engages with the end of the spoke and serves to hold the structure together. This construction is shown more clearly by the dotted lines, Fig. 2, indicating the outline of the grooves and the spokes. As shown in Figs. 6, 9, and 10, the outer periphery and the two sides of each flange or head are cut away transversely, in order to lighten the structure and to aid in the formation of poles at the junctions of two abutting sections, and to increase the magnetic power at those points. By this arrangement, as can be readily seen, the abutting flanges have together the form of a horseshoe-magnet, the two legs of which are perceptibly separated, thus increasing the mutual magnetic action or attractive effects between the armature and the faces of the field-of-force poles. The grooves or recesses formed may be either rounded or square at the bottom, as shown in Fig. 9. In Fig. 2 the grooves are shown as formed only on the periphery of the armature, the grooves on the sides being omitted to prevent confusion. An armature built up of such sections, with the polarities N S, which the construction described tends to produce at the points of junction, is shown in Fig. 12, the coils being indicated by the zigzag heavy lines.

The field-of-force coils upon the connecting-posts D may be wound or connected in various ways. The method herein described of winding or connecting results in the formation of a machine which I term a "bipolar-current" machine; and it consists in giving to the coils a uniform winding, or connecting them uniformly in such a way that all four posts will tend to give to the top plate the same polarity—as, for instance, south, and to the bottom plate the opposite polarity, or north. The pole-piece E will then have a south polarity, and the pole-piece E' a north polarity. The connections of the field-of-force coils on posts D with the armature-coils are illustrated diagrammatically in Figs. 15 and 16.

Figure 16:
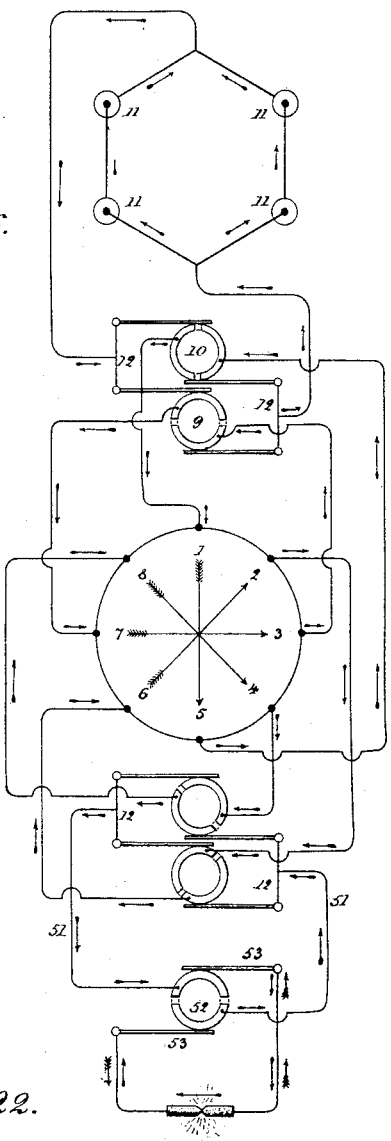

One set of armature-coils is indicated in Figs. 15 and 16 by the numerals 3 7, said coils being diametrically opposite one another on the armature, as indicated in Fig. 16. The same ends of said coils are connected together—that is, either their inner or their outer ends—while the two free ends of the bobbins are connected, respectively, with the halves of a divided commutator-ring indicated at 9, the two halves of which are separated and insulated from one another by slots, as indicated in Fig. 15. Commutator-brushes bear on said ring at diametrically-opposite points, but are applied on the line joining the center of the field-of-force poles, instead of upon the line passing between said pole-pieces. The relative position of the armature-bobbins to the space between the pole-pieces at the time the change of polarity takes place is indicated in Fig. 21. As here shown, the bobbins are on a line at right angles to a line passing through the center of the space between the pole-pieces—that is to say, on the line A A, Fig. 11, passing between said pole-pieces. It will thus be seen that the line of commutation, or line occupied by the bobbins when the brushes pass from one half of the commutator to the other, is the line A A, joining the centers of the field-of-force poles. Another set of armature-coils, displaced from the set 3 7 preferably by an angle of ninety degrees, is indicated at 1 5, which are connected to one another and to another divided commutator-ring, 10, in a similar way to the set 3 7. The dividing-slots of the latter ring are of course correspondingly displaced, and are on a line at right angles to the line occupied by the slots of ring 9. The commutator-brushes of the two rings are properly connected, as indicated at 12, Fig. 15, so that the current from both sets of bobbins is taken in parallel circuit, and is carried through all the field-of-force coils 11 11 11 11 in series in Fig. 15, and in parallel circuit in Fig. 16. The arrows indicate the direction of flow of the currents. If desired, instead of two pairs of brushes connected at 12, a single pair of brushes may be used, each being wide enough to cover both rings. In case of a multiple-arc connection of a number of pairs of bobbins, the brushes may be made wide enough to cover all the rings for said pairs.

It will be of course understood that the angle between any two pairs of bobbins whose currents are combined through the same brushes will depend, in the first place, upon the whole number of bobbins on the armature, and, in the second place, upon the number of pairs of bobbins whose currents are to be combined. For instance, if there be eight bobbins on the armature, and it is desired to employ the current from four of them for energizing the field-magnet, the one pair of bobbins, 3 7, will be in a plane at right angles to the other pair, 1 5. If there be twelve bobbins on the armature, as indicated in Fig. 13, and the field-magnet be energized by the combined current of two pairs, or four bobbins, those pairs should be placed symmetrically with relation to one another, so that the individual bobbins of the two pairs will be at equal distances apart. In this case, as before, the two pairs should be at right angles to one another, bobbins 4 and 10 being the bobbins of one pair, and bobbins 1 and 7 the bobbins of the other pair. If, however, with twelve bobbins on the armature, it be desired to combine the current from six of them, or three pairs, in the same manner that the two pairs are combined, then the three pairs taken should be in planes at equal distances apart, so that the six bobbins will be symmetrically disposed around the armature, and the divisions in the three commutator-rings will also be displaced from one another equally. To secure this result with an armature of twelve bobbins, the three several pairs of bobbins would be taken in planes sixty degrees removed from one another, and the divisions of the commutator-rings would also be severally sixty degrees apart. The bobbins being numbered consecutively, as in Fig. 13, we should in this case take bobbins 1 and 7 for one pair, 11 and 5 for another, and 9 and 3 for the third. The reason for thus disposing the bobbins symmetrically is to secure a balance or equilibrium of magnetic forces, and a uniformity of current-tension in the circuit supplied from the bobbins combined and connected with said circuit. The current for the working-circuit is taken in a similar way from other coils upon the same revolving armature by adding proper commutator rings and brushes, to which said other coils are connected.

In Fig. 16 bobbins 2 6 and 4 8 of an eight-bobbin armature are shown as connected to two divided commutator-rings in the same manner as has been already described with relation to the bobbins which supply the current for charging the field-magnet, while the commutator-brushes for said rings are connected together, and are individually joined to the wires 51 51, which supply a working-circuit directly, so as to give continuous currents therein, or else are connected to the working-circuit, as will be presently described, through a current-alternating device, by which the continuous currents in 51 51 are changed into alternating currents on the working-circuit.

It is of course to be understood that the various commutator-rings, Fig. 16, are on the same armature-shaft and revolve together. By properly connecting the commutator-brushes the currents from the sets or pairs of bobbins may be taken off for tension, as indicated in Fig. 23, or for quantity, as indicated in Figs. 13, 14, and 22. In the latter case, Fig. 22, the currents from two sets or pairs are combined for quantity, and the combined current secured from these two pairs is placed tandem, or for tension with the similarly-combined currents from the other two pairs, by connecting, say, the positive brushes for one pair with the negative brushes of the other or second pair, while the negative brushes of the first and the positive of the second pair are connected to the working-circuits.

Fig. 14 shows how the currents from four pairs of armature-bobbins on a twelve-bobbin armature are combined for quantity, or in what I call "multiple arc," to feed the external or working circuit, while the remaining two pairs are combined in the same way to energize the field-magnet, said latter pairs being connected in what I term "double" or "parallel" circuit, because there are two paths only through which the current may divide in what is sometimes called "multiple arc." The bobbins are numbered to correspond with Fig. 13. As will be seen, the pairs of bobbins which feed the external or working circuit are substantially in symmetrical positions with relation to one another. If we consider 2 8 and 3 9 as forming one set, and 11 5 and 12 6 another set, the first two pairs being in a plane at right angles to the second two pairs, so that, as in the case of the two pairs 1 7 and 4 10, the result is a current that is of uniform strength and is not of a pulsatory or irregular character. Where the bobbins are combined for tension, it is of course to be understood that each pair and its commutator ring and brushes form of themselves a single part of the circuit, and a path for the current from all the other pairs, the negative brush of one pair being connected to the positive brush of another pair, and so on throughout all the commutators and brushes so connected in the manner adopted, in connecting the positive and negative plates of a series of battery-cells when a current of high tension or electro-motive force is desired.

In Fig. 16 the field-of-force coils are fed in what I call "double" or "parallel" circuit, and in Fig. 14 in series or for tension. In the various arrangements of commutators and currents herein indicated no break of circuit takes place at the dividing-point between the halves of the commutator-ring, and none of the bobbins are cut out of circuit at any part of their revolution. The slot is simply for the purpose of allowing for a change of polarity in the armature-bobbins, and is made zigzag, as indicated in Fig. 15, for preventing any break in the circuit as the brush passes from one segment or half of the commutator-ring to the other. In my machine both sets of coils—viz., those supplying the current to energize the field, and those supplying the current to the external or working circuit or circuits—are upon the same armature; but the coils for the field-magnet are electrically entirely independent of the coils for the working-circuit, so that no variations of resistance or change of condition in the latter circuit can by any possibility change the intensity of the current circulating through the field-of-force coils, or can in any manner affect the intensity of the magnetic field, and the maximum intensity of said field, once attained, is never changed, excepting by a change of speed in the machine. No intermittent impulses are interchanged from one circuit to the other—that is to say, the current generated in the set of coils for one circuit is never transferred to the coils supplying the other circuit. In my machine each and every bobbin of the armature is in continuous and direct connection with a commutator-brush, no matter what its position; or, in other words, each pair of bobbins is in continuous or perpetually-closed circuit with regard to the circuit supplied thereby, and, with the exception of the reversal of connection made necessary by the change of polarity, is always in the same relation to the brushes. On the contrary, in other machines the bobbins are either open-circuited or disconnected from the outside circuit at a portion of their path, or else, as in the case of the so-called "continuous-current" Gramme machine, they are not in continuous and direct connection with a commutator-brush, but their position with relation to the brushes is constantly changing or shifting, and, although at one point in their revolution they may be directly connected with a brush, at all other points they are only connected with the same through other bobbins, the number of which is constantly changing.

Fig. 19 illustrates an arrangement whereby an exterior or working circuit, 54 54, may be fed with reverse or alternating currents. For this purpose the continuous currents obtained from bobbins on the same armature with those which serve to energize the field-of-force magnets are turned into such alternating currents by the device shown in Figs. 16 and 19. The current from the commutator-brushes is taken by connections 51 to the two sides of intermittent and current-reversing commutator 52, the two brushes of which (indicated at 53) bear upon the two halves thereof in such a way that they are alternately and intermittently connected to opposite sides of the commutator, so that intermittent and reverse or alternating currents are produced in the external or working circuit, 54. In practice this commutator is made of two bands or rings, 52 52, Fig. 24, having dental projections or teeth $a^2$ overlapping or interlocking with one another, as indicated. The duration and time of each alternating or reversed impulse in the exterior circuit, 54, is governed by the width of the dental projection on the two bands 52 and the speed at which the commutator rotates, and is or may be therefore entirely independent of the time and duration of the currents generated and circulating in the revolving armature-coils.

In Figs. 17 and 18 is illustrated a novel mechanical construction for bringing the electrical connections from the armature-coils through the shaft and to the commutator located outside of the bearings of said shaft. Fig. 17 is a longitudinal section of the commutator and shaft, and Fig. 18 is a cross-section on the line $x\,x$ of Fig. 17. F indicates the shaft, made hollow at its bearing portion 25. A cylindrical core of insulating material, 26, is fixed in the interior of the shaft F, and centered by means of washers 28. Bars of conducting material 27, fixed upon the face of the insulating-cylinder, or placed in grooves in the same, serve to convey the currents from the armature-coils to the commutator-rings, connection between said bars and the armature-coils being made by screw-bolts 14, which pass through insulating-washers and screw into the ends of the bars, the free ends of the armature-coils being connected to screw-cups formed on the outer ends of the bolts. The space between the bars and the outer shell of the shaft, and also the cavity in the part 26, allow the circulation of air and tend to keep the parts cool. The commutator rings, bars, or segments are indicated at 40, secured to an insulating-cylinder, 41, which is mounted upon a metal tube, 42, firmly fixed in the end of the hollow shaft F by dowels or screws or other means, so that said tube, with the attached sleeve 41 and the commutator-rings 40, may be detached from the shaft at pleasure. Connection between the rings 40 and the central bars, 27, is made by auxiliary bars or strips 43, mounted upon an insulating-sleeve, 45, which strips are metallically connected at one end by screws 46 to projecting strips extending from the several rings and lapping under the strips 43, and at the other end by screw-bolts 47, which screw into the ends of the central connecting-bars, 27.

It is obvious, by examining Fig. 1, that I might employ a field-magnet having bars or rods on one side only of the pole-pieces E E, instead of on both sides. In such case I might use one field-magnet only, instead of two. Such forms would, however, be less powerful than that shown.

What I claim as my invention is—

1. In a dynamo-electric machine, two solid grooved semicircular pole-pieces joined by one or more connecting bars or rods, forming the core of a field-magnet, each of said bars or rods being made in one piece and wound with a magnetizing coil or helix.

2. In a field-magnet for a dynamo-electric machine, a bar or rod wound throughout its length with a magnetizing-helix, and provided at its opposite ends with directly-connected solid pole-pieces projecting toward one another, and having recesses at their ends curved on the line of rotation of the armature, and on a line at right angles thereto, so as to closely embrace said armature with a solid polarized mass on its periphery and on its two sides.

3. The combination, substantially as described, of parallel field-of-force magnets, re-entering or returning solid pole-pieces projecting toward one another and parallel to said magnets, and a circumferential groove or recess in said pole-pieces embracing the periphery and two sides of an armature revolving in said groove parallel to the field-magnets.

4. A field-magnet for a dynamo-electric machine, consisting of two or more parallel field-magnet cores directly connected at each end to a common intermediate solid pole-piece re-entering and projecting toward the pole-piece at the other end, said pole-piece being in close proximity to the field-magnet coils, as and for the purpose described.

5. The combination, with two or more magnets arranged parallel to each other, and having their poles or extremities bent inwardly between said magnets and approaching each other, and also parallel with the sides of said magnets, of an armature revolving between said poles and parallel both to said poles and said magnets.

6. The combination, substantially as described, of the iron top and bed plates having grooved pole-pieces formed in one piece with said plates and projecting toward one another, said pole-pieces being curved to the circumference of the armature revolving between them, and connecting bars or posts, D, wound as described, to induce in said pole-pieces the polarities set forth.

7. A top or bottom plate for a dynamo-electric machine, made of iron, and provided with a projecting pole-piece integral with it, and grooved and curved in the manner described, so as to embrace the armature upon three of its sides.

8. The combination, substantially as described, of a number of parallel bars or rods, D, each wound with energizing-coils, and plates of iron secured to the ends of said bars and constituting common poles therefor, each of said poles being provided with a pole-piece formed in one piece or integral with the plate, and projecting toward a similar pole-piece projecting from the other plate.

9. The combination, substantially as described, of a series of magnets, D, terminating at each end in a common iron plate or piece, B or B', formed into a pole-piece of the shape described, the whole forming a double compound U-magnet.

10. The combination, with the plate B, forming a pole-piece, of a bar or rod, D, wound with a magnetizing coil or helix, and provided with a flange or head, $k$, of a magnetic material, resting in magnetic contact with said plate, as and for the purpose described.

11. The combination, with the parallel bars D, and the common plates or poles B B', formed into projecting pole-pieces E E', of magnetizing coils or helices for said bars, wound and connected as set forth, so as to form in the pole-pieces polarities as and for the purpose herein described.

12. In a dynamo-electric machine, armature coils or helices arranged in two planes at right angles or approximately at right angles to one another, and supplying current in double or parallel circuit, as described, said coils being arranged and commutated in the manner described, so that the coils in both planes are in constant connection with their respective commutator-brushes, and the coils in one plane are in an active position and passing the line of commutation at which the brushes pass from one segment to the other, while the coils in the other plane are in an active position and furnishing current to the outer circuit.

13. In a dynamo-electric machine, a number of armature-circuits combined in multiple arc, and double or parallel circuit, as described, and as shown in Fig. 14, each circuit being constantly closed with relation to the outside circuits, and always including the same coils.

14. The combination, with a series of armature bobbins or helices divided into sets and revolving between two curved field-of-force poles, of separate commutator-rings, the halves of which are divided so as not to break the connection of any set with the brushes, and commutator-brushes applied to said rings, so as to pass the divisions thereon when the bobbins are on the line joining the field-of-force poles.

15. In a dynamo-electric machine, a group of armature coils or helices arranged in double or parallel circuit, as described, in combination with one or more other and similar groups or coils connected in tandem with the first-named group, said coils or helices being always in connection with pairs of commutator-brushes during revolution of the armature, and, with the exception of the reversal of connections made necessary by a change of polarity, always in the same connection with their respective brushes.

16. In a dynamo-electric machine, an armature having two sets of bobbins independent of one another, one set being connected to the field-of-force coil solely, and supplying a continuous current thereto, while the other set is connected through commutators or collectors and reversing or alternating devices, as described, solely with an exterior or working circuit.

17. The combination, with a continuous-current dynamo-electric machine, of suitable means for turning the continuous currents into alternating currents upon the exterior or working circuit.

18. The combination, with the armature of a dynamo-electric machine producing continuous currents, of a commutator interposed between said machine and the exterior working-circuit, and turning said continuous currents onto alternating currents, substantially as described.

19. The combination, with a set of armature-coils symmetrically and geometrically arranged, as described, and serving solely to energize the field-magnet of the machine, of one or more symmetrically and geometrically arranged sets of coils on the same armature but in different armature-planes from those of the first set, for supplying currents to one or more exterior working-circuits.

20. The combination, with the armature of a dynamo-electric machine, of two or more sets of coils, said sets being symmetrically and geometrically disposed with relation to one another in different armature-planes, as described, and arranged to supply currents independently of one another for various purposes, as described.

21. The combination, in a dynamo-electric machine, of a set of armature-coils, and a commutator or commutators for the same, to the two brushes or sets of brushes of which commutator the terminals of the field-magnet coils are connected, and one or more additional sets of armature-coils arranged symmetrically with relation to one another and to the coils of the first set, and supplying current independently of the first set to a working circuit or circuits.

22. In a dynamo-machine, an annular armature built up of segmental magnets, as described, and connected and held together with spokes and nuts, so that by means of two of the nuts any one of said magnets can be removed from said armature for repairs or for winding the coils.

23. In a dynamo-machine, an annular armature built up of segmental magnets, and held together by spokes and nuts in the manner and for the purposes stated.

24. In combination with the field-magnets of a dynamo-machine, and revolving between the jaws or poles of the said magnets, an annular armature built up of segmental magnets, as described, whose poles or abutting ends are in metallic and magnetic contact.

25. In dynamo-machines, an annular armature built up of segmental magnets whose abutting or joining ends are cut away on the sides, so as to be below the plane of the coils or flanges of said magnets, so as to form U-magnets, and for other purposes stated.

26. In an annular armature, the combination, with the hub $k$, of the spokes $n$, fixed by dowels in the hub, and provided with screw-thread and nut at their outer extremities, and armature-sections having countersunk grooves in their heads for receiving said spokes and nuts.

27. The combination, with the iron bedplate forming a portion of the field-of-force magnet, of an armature-shaft supported on said plate, but magnetically insulated therefrom, as and for the purpose set forth.

28. The combination, with the hollow armature-shaft, of an interior supporting tube or rod, 26, of insulating material, and conducting-bars attached to said tube, as and for the purpose described.

29. The combination, with the hollow armature-shaft, of an interior supporting bar or tube, 26, of insulating material, conducting-bars attached to or mounted upon said tube, and connecting screw-bolts screwing into the ends of said bars to complete the electrical connection between the armature and the commutator.

30. The combination, of an insulating-cylinder, 41, commutator plates or segments thereon, and a supporting-tube, 42, detachably secured to the end of the armature-shaft.

Signed at New York, in the county of New York and State of New York, this 10th day of June, A. D. 1882.

SILVANUS F. VAN CHOATE.

Witnesses:
H. C. TOWNSEND,
THOS. TOOMEY.